US008854468B2

(12) United States Patent
Berkey et al.

(10) Patent No.: US 8,854,468 B2
(45) Date of Patent: Oct. 7, 2014

(54) METHOD AND SYSTEM FOR VIDEO SURVEILLANCE SYSTEM MOTOR OVERCURRENT PROTECTION

(75) Inventors: Thomas F. Berkey, Tavernier, FL (US); Lawrence R. Mills, Coral Springs, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 2070 days.

(21) Appl. No.: 11/951,652

(22) Filed: Dec. 6, 2007

(65) Prior Publication Data

US 2008/0136913 A1 Jun. 12, 2008

Related U.S. Application Data

(60) Provisional application No. 60/873,379, filed on Dec. 7, 2006.

(51) Int. Cl.
*H04N 7/18* (2006.01)
*H04N 5/232* (2006.01)
*G08B 13/196* (2006.01)
*G05B 19/4062* (2006.01)
*H02H 7/085* (2006.01)

(52) U.S. Cl.
CPC ............ *H04N 5/232* (2013.01); *H02H 7/0856* (2013.01); *G08B 13/1963* (2013.01); *G05B 19/4062* (2013.01); *G05B 2219/42288* (2013.01)
USPC ............ 348/154; 348/151; 348/155; 709/224

(58) Field of Classification Search
USPC ........................................................ 348/154
See application file for complete search history.

(56) References Cited

U.S. PATENT DOCUMENTS

| 3,932,789 | A | * | 1/1976 | Sons et al. ....................... 361/31 |
| 4,780,738 | A | * | 10/1988 | Fukahori et al. .............. 396/135 |
| 4,825,394 | A | * | 4/1989 | Beamish et al. .............. 356/147 |
| 4,841,370 | A | * | 6/1989 | Murashima et al. .......... 348/351 |
| 5,155,515 | A | * | 10/1992 | Kohmoto et al. .............. 396/76 |
| 5,408,332 | A | * | 4/1995 | Murakami et al. ............ 348/345 |

(Continued)

FOREIGN PATENT DOCUMENTS

CN 1138168 A1 12/1996

OTHER PUBLICATIONS

International Search Report and Written Opinion dated Nov. 14, 2008 for International Application No. PCT/US2007/025014, International Filing Date Dec. 6, 2007 (17- pages).

(Continued)

*Primary Examiner* — Mohamed Ibrahim
(74) *Attorney, Agent, or Firm* — Christopher & Weisberg, P.A.

(57) ABSTRACT

The present invention provides a video surveillance system, having a video camera; a motor operable to move the video camera; and a processor monitoring a value of a signal provided to the motor, the processor terminating the signal to the motor when the monitored signal value exceeds a predetermined value for a predetermined period of time. A network may be coupled to the processor for communication of the signal termination. The processor may reinitiate a signal transmission to the motor sufficient to maintain a position of the motor after a predetermined period of time, and the processor may monitor the signal transmission and adjust at least one of a zoom setting and focus setting of the video camera based at least in part on the monitored signal.

17 Claims, 6 Drawing Sheets

(56) References Cited

U.S. PATENT DOCUMENTS

| | | | |
|---|---|---|---|
| 5,801,770 A * | 9/1998 | Paff et al. | 348/211.5 |
| 6,163,341 A | 12/2000 | Kawaguchi et al. | |
| 6,285,154 B1 * | 9/2001 | Yasuda et al. | 318/685 |
| 6,577,343 B2 * | 6/2003 | Ohkawara | 348/347 |
| 7,113,351 B2 * | 9/2006 | Hovanky | 359/824 |
| 7,209,175 B1 * | 4/2007 | Kurokawa et al. | 348/345 |
| 7,882,394 B2 * | 2/2011 | Hosek et al. | 714/26 |
| 2001/0028395 A1 * | 10/2001 | Kawai et al. | 348/211 |
| 2002/0171751 A1 * | 11/2002 | Ohkawara | 348/347 |
| 2003/0038606 A1 * | 2/2003 | Beishline | 318/452 |
| 2003/0137265 A1 * | 7/2003 | de Frutos | 318/468 |
| 2004/0207748 A1 * | 10/2004 | Kikuchi | 348/362 |
| 2004/0263681 A1 * | 12/2004 | Teramoto et al. | 348/375 |
| 2005/0052560 A1 * | 3/2005 | Murakami | 348/335 |
| 2007/0024228 A1 * | 2/2007 | Fujinaka | 318/696 |
| 2007/0067678 A1 * | 3/2007 | Hosek et al. | 714/25 |
| 2007/0115358 A1 * | 5/2007 | McCormack | 348/159 |
| 2008/0055409 A1 * | 3/2008 | Mars et al. | 348/143 |
| 2008/0165431 A1 * | 7/2008 | Kokabu | 359/697 |
| 2009/0135531 A1 * | 5/2009 | Hirata | 361/18 |
| 2009/0167858 A1 * | 7/2009 | McCormack | 348/143 |
| 2012/0087644 A1 * | 4/2012 | Swarr | 396/427 |

OTHER PUBLICATIONS

1st Canadian Examination Report dated May 27, 2014 for corresponding Canadian Application Serial No. 2,672,182, Canadian Filing Date: Jun. 5, 2009, consisting of 2 pages.

* cited by examiner

METHOD AND SYSTEM FOR VIDEO SURVEILLANCE SYSTEM MOTOR OVERCURRENT PROTECTION

CROSS-REFERENCE TO RELATED APPLICATION

This application is related to and claims priority to U.S. Provisional Patent Application Ser. No. 60/873,379, filed Dec. 7, 2006, entitled Video Dome and System, the entirety of which is incorporated herein by reference.

STATEMENT REGARDING FEDERALLY SPONSORED RESEARCH OR DEVELOPMENT n/a

FIELD OF THE INVENTION

The present invention relates to electric motor protection and in particular, to a method and system providing video surveillance camera motor over-current and stall protection and allowing manual positioning when automatic positioning can not be made.

BACKGROUND OF THE INVENTION

Video surveillance systems often include one or more video cameras positioned throughout an area of interest, where the individual cameras are movable, i.e., to pan, tilt, and/or zoom, by one or more electric motors coupled to the camera. The motors may be connected to a monitoring station through a network for receiving movement commands and, just like any other electric motor, they are subject to signal or current overloads that can damage or destroy a particular motor, thereby potentially rendering the video camera assembly inoperable.

There are numerous existing methods and devices to protect motors and motor drive circuits from short circuits. These devices range from simple fuses or positive temperature coefficient devices ("PTCs") to integrated circuits ("ICs") that sense the current to the motor and intercede if a peak current threshold is detected. A more sophisticated, and thus more expensive, device includes one or more motor driver ICs that can be set below a locked rotor level of current that will only intercede and break the current to the motor if the locked rotor level current is detected over a longer period of time than would otherwise be normal for a particular motor.

In addition, some motor control ICs may have locked-rotor and short circuit protection. These typically higher-end circuits often cost much more than simple fuses, PTCs or ICs providing only short-circuit protection. Many of the lower cost motor driver ICs have a fixed current limit, which is good for protecting against short circuits, but is not very useful for protecting against a locked rotor condition. A locked rotor condition often occurs during motor start-up, but a locked rotor condition occurring over an extended period of time indicates a malfunction and would likely damage the motor. From a cost standpoint, of course, it is most desirable to use the lower cost motor driver ICs with a non-integrating type of current protection rather than the costly motor ICs having locked-rotor and short circuit protection.

In addition to preventing an over-current and/or locked rotor condition, another problem in current video surveillance systems relates to the loss of video dome communication with a processor and/or monitoring station. A typical video surveillance system has a central processor, typically implemented as a part of one or more video matrix switches. The matrix switches may have keyboard inputs to facilitate manual control of the components or cameras of the surveillance system, and to provide a means for inputting system setup parameters. The matrix switches route video from the surveillance camera of interest to an operator's display monitor. Matrix switches also can be pre-programmed to sequentially select, in a pre-determined order and dwell time for example, the video inputs from assorted cameras and feed that video stream to a time lapse VCR, digital recorder or other video recording device.

In critical installations, it is often desirable, and in some cases required by law, to have continuous recording of certain video input streams. Casino gambling tables are one example. In these situations, when video coverage is lost, the table has to be shut down. In many of these situations, the video passes to a full time recorder before passing on to a matrix switch. Such a configuration allows full time recording of a particular video stream while allowing an operator to selectively view and control individual domes or cameras. Some larger systems may also have junction box arrangements where the video is either passed straight through or is amplified and passed on through. Such junction boxes generally buffer or split and re-drive the control network to allow connection of more domes or use of longer network lines than would otherwise be possible.

Any one of these example devices and configuration described above can fail in such a way as to prevent communication to the surveillance camera, even though the camera is powered and in perfect working order. In critical systems, when there is a loss of communication to the camera, but the video from the camera is still being captured and/or recorded, it would be desirable to manually aim the dome at a particular area of interest, such as a gaming table for example. However, emergency positioning of a camera can often only be achieved by routing the control to the camera from another processor, thereby bypassing the defective system device. Another option generally includes having a portable keyboard/processor that could be carried to the camera and fed into a control port on the camera. Still, rewiring the camera communication to the keyboard/processor may require an unacceptable time period to complete and/or require skilled electricians to be called in to make the repair.

Moreover, even though communication with the camera assembly may be lost, the motors of the assembly will typically still be powered to maintain their current positions. As such, any attempt to manually reposition the camera assembly, and thus the motors, will be resisted by an increase of current to the motor to counteract the manually applied torque in an effort to maintain the camera position. As a result, even if the camera assembly is operational except for the signal communication with a monitoring station or the like, an attempt to manually reposition the camera may actually cause significantly more damage as the motors become overloaded trying to stay in place.

In view of the above, it is desirable to provide a simplified solution for over-current protection for a motor, as well as to allow for the manual positioning of a video camera assembly upon interruption or malfunction of a system component.

SUMMARY OF THE INVENTION

The present invention advantageously provides a motor over-current protection system, including a processor assessing (a) a signal value corresponding to an accumulation of current provided to a motor and (b) a speed of the motor, the processor terminating the current to the motor based on at least one of the assessed signal value and the assessed speed. The processor may terminate the current provided to the motor when the signal value exceeds a predetermined value for a predetermined period of time, and further, the processor may terminate the current to the motor when the assessed signal value exceeds a predetermined value for a predetermined period of time and the assessed speed is less than a predefined speed value. A pulse-width-modulation driver is in electrical communication with the processor, the pulse-width-modulation driver providing the current to the motor by adjusting the duty cycle of the signal. The processor reinitiates the current to the motor after a predetermined period of time.

The present invention also provides a video surveillance system, including a video camera; a motor operable to move the video camera; and a processor assessing a signal value corresponding to an amount of current provided to the motor, the processor terminating the current to the motor when the assessed signal value exceeds a predetermined value for a predetermined period of time. The processor may assess a speed of the motor and terminate the current to the motor when the assessed signal value exceeds a predetermined value for a predetermined period of time and the assessed speed is less than a predetermined speed value. The processor may reinitiate the application of current to the motor sufficient to maintain a position of the motor after a predetermined period of time, and the processor may monitor a signal value corresponding to the amount of current and adjusts at least one of a zoom setting and focus setting of the video camera based at least in part on the monitored signal value.

The present invention also provides a method of operating a video camera assembly having at least one motor, including defining a threshold signal value corresponding to an accumulation rate of current provided to the motor; monitoring a value of a signal corresponding to an accumulation rate of current provided to the motor; determining that the monitored signal value exceeds the threshold signal value for a predetermined period of time; and terminating the current to the motor. The signal may be a pulse-width-modulation signal, and the defined threshold signal value may be less than 100% for a pulse-width-modulation signal duty cycle. The method may also include defining a threshold speed of the motor; monitoring a speed of the motor; and determining that the monitored speed is lower than the threshold speed, as well as communicating the termination of the current across a communication network. The method may also include manually applying a force to the assembly until the monitored signal value exceeds the threshold signal value, allowing manual repositioning of at least a portion of the video camera assembly, monitoring movement of at least a portion of the video camera assembly, reestablishing current to the motor after a predetermined time period lapses without any monitored movement, and manually applying a force to at least a portion of the camera assembly to adjust of at least one of a focus setting and zoom setting of the camera assembly.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
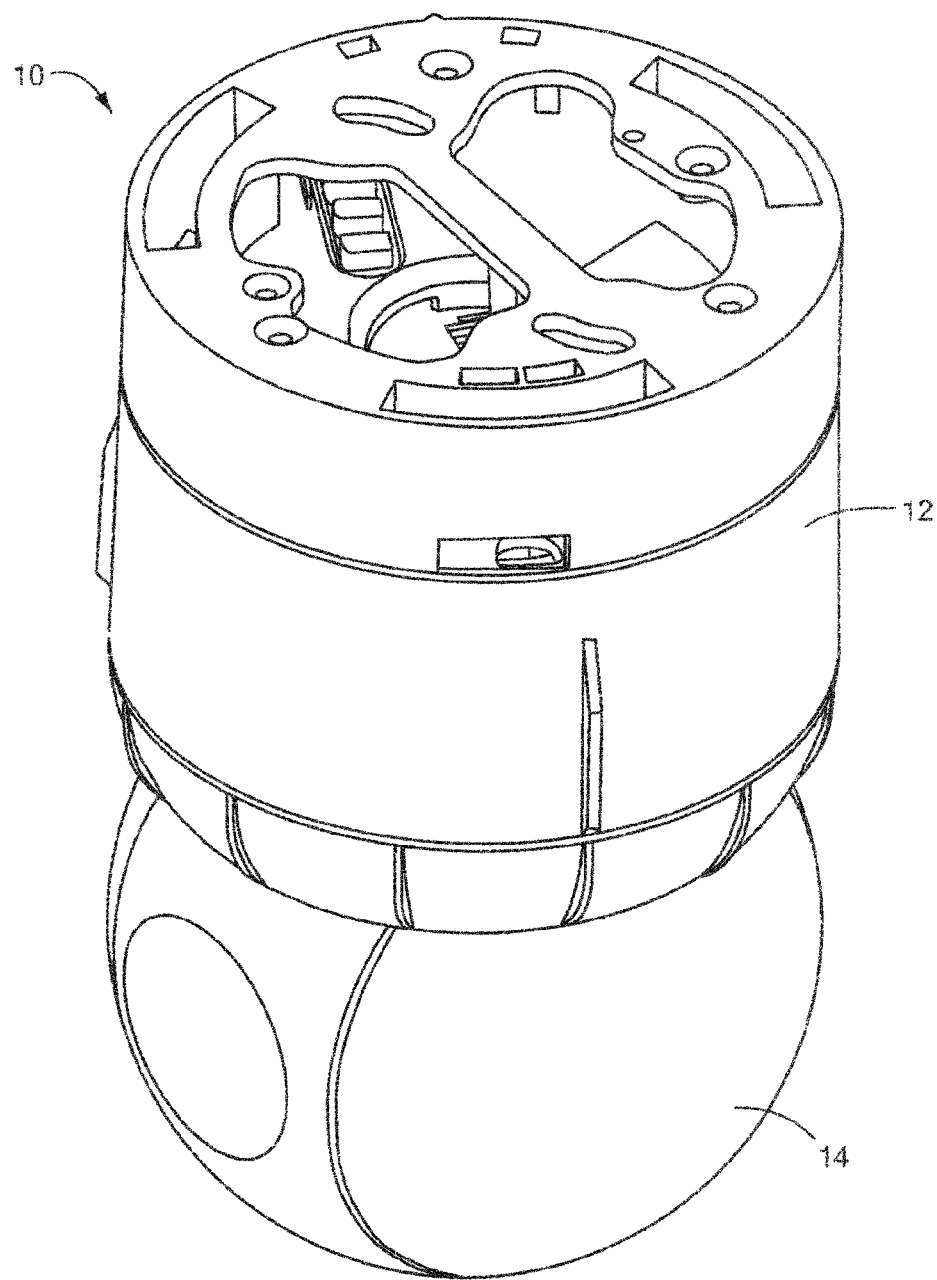
FIG. 1 is a perspective view of a video surveillance system constructed in accordance with the principles of the present invention.

The present invention provides a video surveillance system with over current motor protection, stall protection and method thereof. Referring now to the drawing figures in which like reference designators refer to like elements, there is shown in FIG. 1, a video surveillance system constructed in accordance with the principles of the present invention and designated generally as "10". The video surveillance system 10 may generally include a housing assembly 12 in operative communication with a camera assembly 14, each of which may contain various mechanical and electrical components facilitating the operation thereof.

Figure 2:
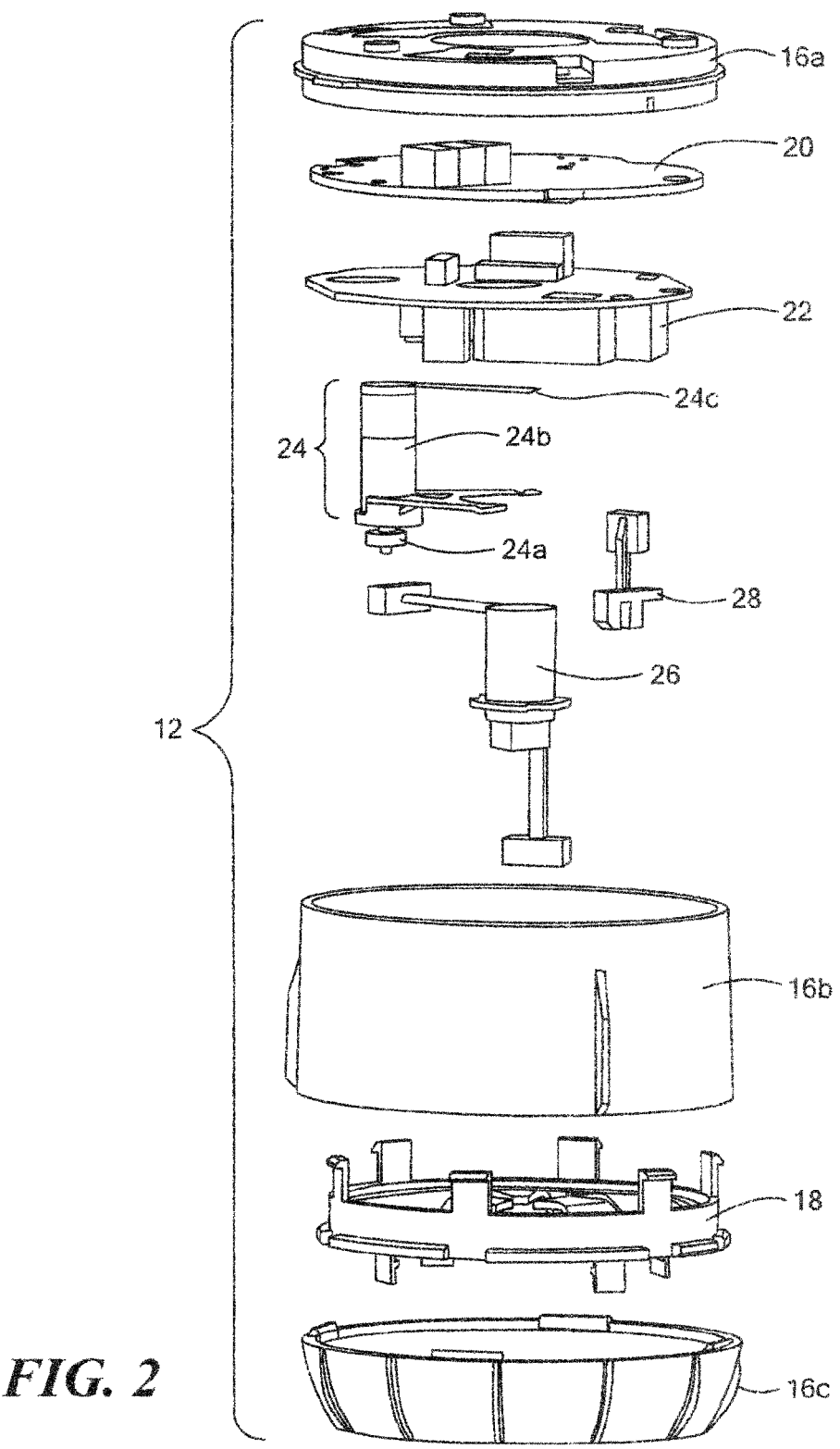
FIG. 2 is an exploded view of a housing assembly of the video surveillance system of FIG. 1.

Now referring to FIG. 2, in particular, the housing assembly 12 may include one or more housing elements 16a, 16b, 16c (referred to collectively herein as housing elements 16) encasing or otherwise enclosing a portion of the housing assembly contents. The housing elements 16 may be movably engaged to one another by a rotatable bearing pan platform 18 or similar mechanical coupling. The housing assembly 12 may further include a printed circuit or central processing unit ("CPU") board 20 and a power supply 22 coupled to a pan motor 24. The CPU board 20 may include one or more processors, memory components, controllers, and/or a communications interface (not shown) for receiving, storing and/or executing commands or input from a remote location and for driving the pan motor 24. The power supply 22 may include a power source, such a battery or the like, and/or may further include electrical components for receiving and appropriately converting AC power from an external source to power the components described herein. The pan motor 24 may include a DC motor having the desired form factor and/or dimensions positionable within the housing assembly while having sufficient torque output to controllably move the desired components of the video surveillance system.

The housing assembly 12 of the video surveillance system 10 may further include motor assembly 24 having a gear train 24a coupled to a pan motor 24b and an encoder 24c, where the motor assembly 24 imparts, transfers, or otherwise conveys the output of the motor 24 to additional portions of the video surveillance system 10 to produce the desired movement. In particular, the encoder 24c may include a mechanical or optical incremental rotary encoder used to indicate movement of either the gear train 24a or the pan motor 24b. The movement indication can be used to determine the relative pan position of the camera assembly 24 as well as to actuate the pan motor 24 to move a portion of the housing assembly 12 and/or the camera assembly 14 along a desired motion pattern or series of controlled movements. In addition, a slip-ring assembly 26 may also be included in the housing assembly 12 and may further be coupled to the rotatable bearing platform 18 and housing element 16c to both provide an electrical connection to the pan platform, as well as enable the platform to move in an unlimited number of contiguous 360° revolutions. The housing assembly may also include an optical sensor 28 for monitoring the home position of the housing assembly 12 during operation.

Figure 3:
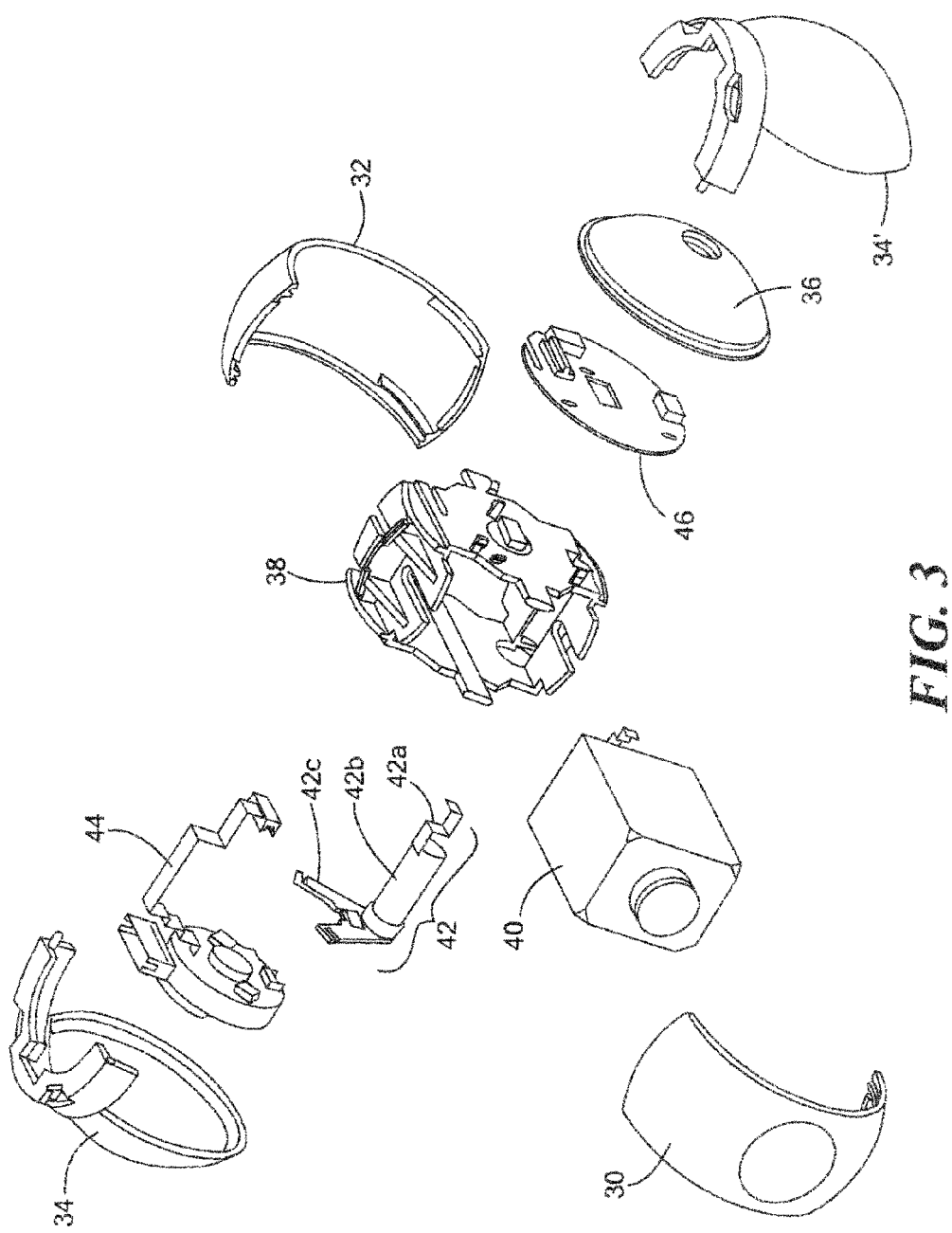
FIG. 3 is an exploded view of a camera assembly of the video surveillance system of FIG. 1.

As shown in FIG. 3, the camera assembly 14 of the video surveillance system 10 of the present invention may generally include one or more camera housing elements able to form a shell or cavity to contain or otherwise enclose additional components of the assembly. For example, there may be a front 30, rear 32, and two side 34, 34' camera housing elements engageable with one another, where one or more of the housing elements are rotatably or otherwise movably coupled to the others by a bearing component 36 and a tilt gear/bearing assembly 44. The camera assembly 14 may also include a camera cradle or yoke 38 able to receive a camera 40 securely therein. The camera 40 may include any device able to capture a visual image, including but not limited to color cameras, black and white cameras, digital capture devices, etc.

A tilt motor assembly 42 having a tilt encoder 42a, a tilt motor 42b, and a tilt gear train 42c may be disposed within the camera assembly 14. In addition, a PC board 46 may also be included in the camera assembly 14 within the housing. The tilt motor 42b may be mechanically coupled to the camera cradle 38 for movement thereof, while the tilt encoder 42a may be similar to the pan encoder 24c described above with respect to the pan motor assembly 24, i.e., the encoder may include a mechanical or optical incremental rotary encoder for monitoring the rotation or movement of the tilt motor 42b. The PC board 46 may include one or more electrical components, processors, memory components, controllers, cable connectors and/or drivers (not shown) for receiving, storing, and/or conveying commands to and driving the tilt motor assembly 42, as well as for receiving, storing, and/or transmitting images generated by the camera 40.

Figure 4:
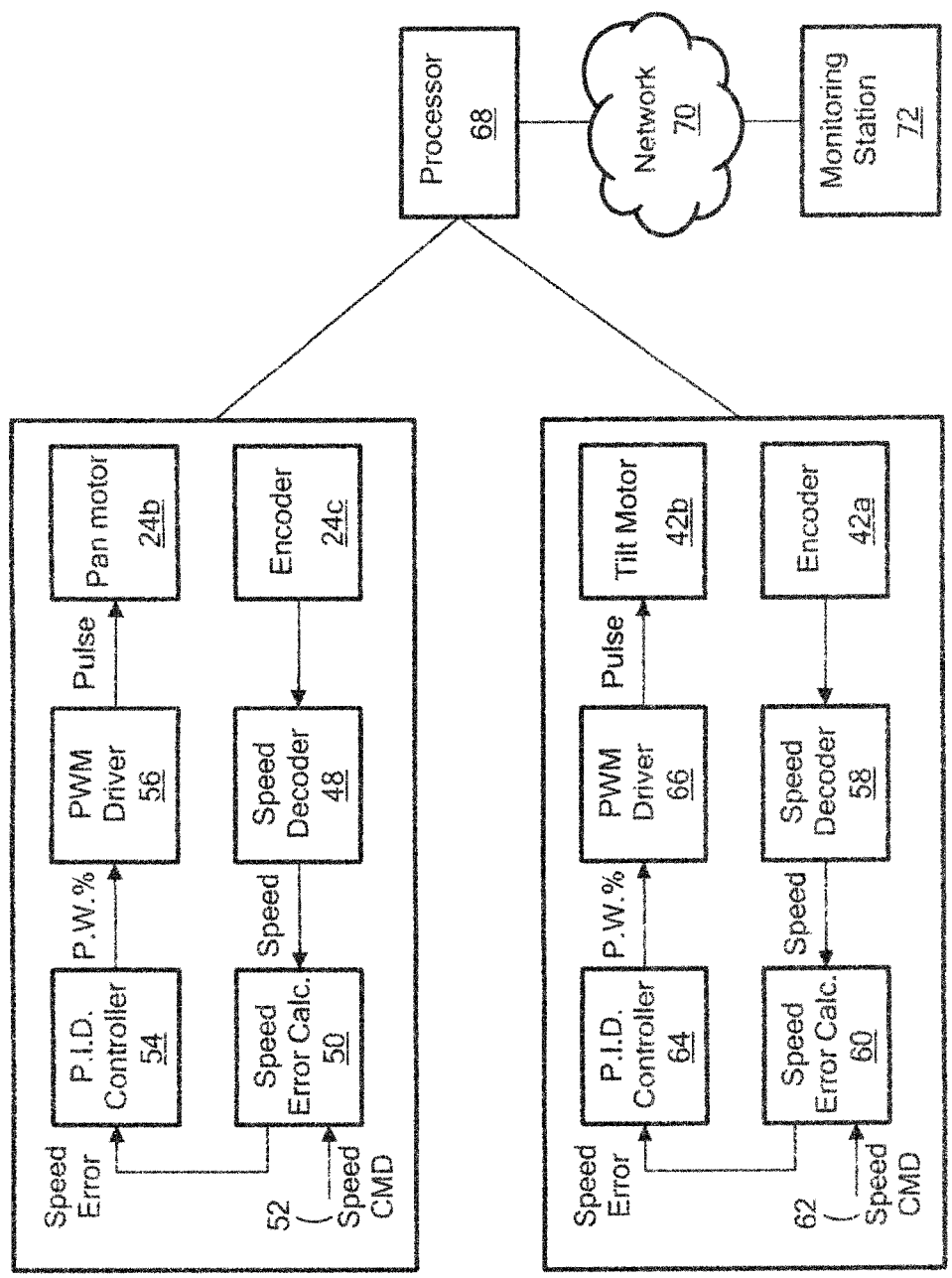
FIG. 4 is a block diagram of a video surveillance system constructed in accordance with the principles of the present invention.

Now referring to FIG. 4, a block diagram of an improved system and method for operation of the video surveillance system illustrated in FIGS. 1-3 is shown. In particular, the system includes the pan encoder 24c and pan motor 24b of the pan motor assembly 24 for movement of the camera assembly 14 in the horizontal (pan) axis and the tilt motor 42b and encoder 42a of the tilt motor assembly 42 for movement of the camera assembly 14 in the vertical (tilt) axis. For the pan assembly, the pulse stream output of the pan encoder 24c is converted to speed by a speed decoder 48, which may take into account the number of increments or edges per revolution of the motor 24b to produce a measured speed output. The speed decoder 48 outputs the calculated speed value to a speed error calculator 50, which compares the speed measurement decoded from the encoder 24c with a speed input command 52. The speed error is then fed into a proportional-integral-derivative ("PID") algorithm of a PID processor 54, which may include a micro-processor, Digital-Signal-Processor ("DSP"), Field Programmable Gate Array ("FPGA") or other device capable of performing the PID calculations at a particular PID update frequency.

In this type of control system, Proportional, Integral and Derivative error terms are summed to derive an output value to control a voltage level or pulse width modulated ("PWM") signal which drives a DC motor. The speed error value used in such a PID control system is typically calculated by subtracting the measured speed from the commanded or desired speed. The proportional term is calculated by multiplying the speed-error by a proportional constant. The derivative term is calculated by multiplying the change-in-speed-error by a derivative constant. Change-in-speed-error is the current speed error minus the previous speed error. If the speed error has not changed, the derivative term will be zero.

When the error goes from zero to a positive value, the derivative term can add to that of the proportional term. This gives the circuit a faster response when the error is increasing. Similarly, if the error is cut to half the previous value, the derivative term will be negative while the proportional is still positive. In this condition, the derivative term is reducing the effect of the proportional term when the speed is approaching the commanded speed and the error is decreasing.

The integral term may be calculated by multiplying the speed-error by an integral constant and adding that to an accumulator. The integral constant is usually much lower than the proportional or derivative constants, such that the integral accumulation slowly ramps up or down to remove any steady state error that the proportional or derivative terms cannot compensate for. The steady state speed will be controlled entirely by the integral term, because when the speed is equal to the commanded speed, the error is zero and both the proportional and derivative terms will become zero. The integral term will be just large enough to compensate for steady state load.

The output of the PID calculation may be used to control the pulse width sent to the pan motor 24b via a PWM driver 56. The PWM driver 56 may be a low cost integrated circuit that contains an over-current protection circuit that has a current limit set slightly above the maximum locked-rotor current specified by the motor manufacturer to protect against short circuits. The tilt motor 42b may be similarly controlled via a speed decoder 58, speed error calculator 60, speed input command 62, PID processor 64, and PWM driver 66 coupled to the tilt motor 42b and tilt encoder 42a.

The system further includes a processor 68 operably and/or electrically coupled to a video camera assembly, such as either and/or both of the housing assembly 12 and camera assembly 14 and the components therein described above. The processor 68 may include a micro-controller, microprocessor or other device able to send and receive signals and/or commands during operation of the video surveillance system, and to further control or otherwise actuate the one or more motors of the system in response to the sent and/or received signals. The processor 68 may further include and/or interact with an electronic storage component (not shown) which stores commands, settings, signals, executable instructions, scripts or the like employed during operation. The electronic storage component may include volatile or non-volatile memory such as, for example, static random access memory ("SRAM"), dynamic random access memory ("DRAM"), fast page mode dynamic random access memory ("FPM DRAM"), extended data-out dynamic random access memory ("EDO DRAM"), synchronous dynamic random access memory ("SDRAM"), double data rate synchronous dynamic RAM ("DDR SDRAM"), electronically erasable programmable read only memory ("EEPROM") such as flash memory with or without a processor, hard disk enabled virtual memory, and/or other data storage devices that may be operably coupled to the processor.

In addition, the processor 68 may be coupled to a wired or wireless communication network 70 for sending and receiving signals or commands from a monitoring station 72, which may be at a remote secondary location from the camera assembly. Of note, the processor 68, electronic storage component, and other electronic components described herein may be integrated or otherwise embodied within either and/or both of the CPU boards 20, 46 described above. Further, the hardware components described herein, including the processor 68, may also be contained within a ceiling mount or similar structure engageable with a portion of the housing assembly and/or camera assembly at an installation site. As such, the processor 68 may remain operable at a particular video camera assembly site, even if portions of the video assembly are subsequently replaced or if communication between the processor 68 and the monitoring station 72 is lost.

An exemplary method of operating the motor and/or video surveillance system described above may generally include monitoring abnormally high deviations in the Integral portion of a PID control algorithm to detect likely stall conditions. Upon detection of this abnormal condition, the system may terminate output voltage to the motor. In addition, if the abnormal condition occurs when the motor is trying to hold position, the system may proceed through a sequence of states to discontinue attempts to maintain camera position, thereby allowing an operator to manually position the dome without damaging the motors.

Figure 5:
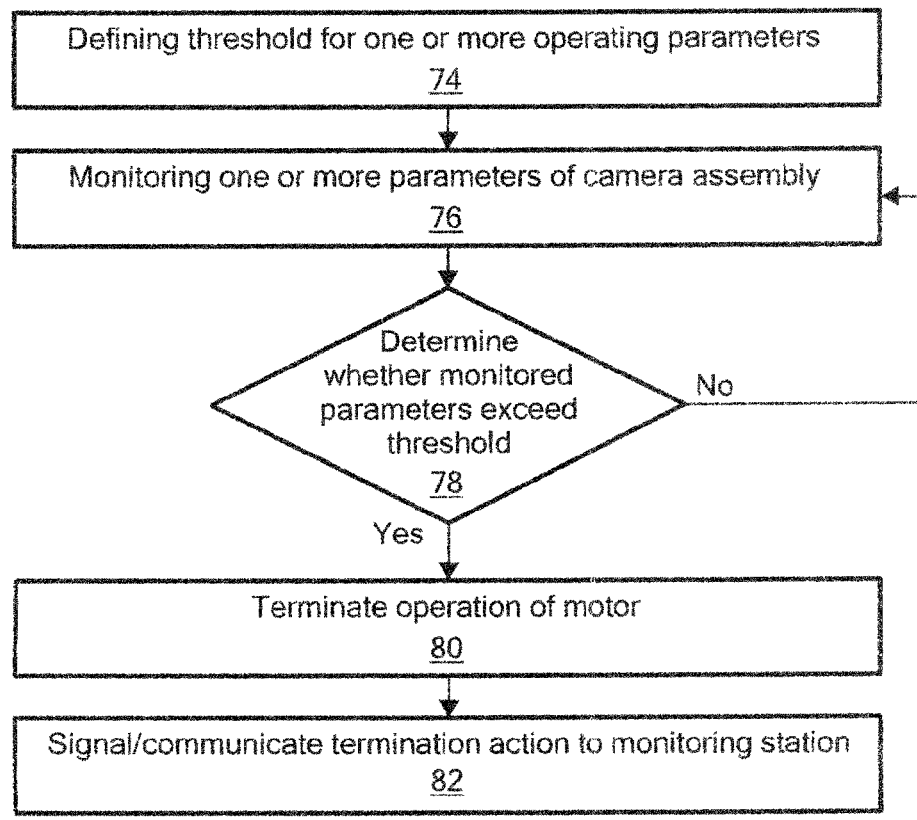
FIG. 5 is a flow chart of an exemplary method for protecting a video surveillance system in accordance with the present invention.

Now referring to the flow chart of FIG. 5, in particular, a method of the present invention for providing motor stall protection may include defining a threshold for one or more operating parameters of the camera assembly (Step 74). The parameters may include, for example, the output of the PID processor 54, 64 and/or the PWM drivers 56, 66 which may damage the tilt and pan motors 24b, 42b, as well as a speed of the motor. The pre-determined cutoff speed may be picked as the lowest speed the motor can safely run with continuous full voltage applied and a maximum load for example. The threshold may include a particular output signal value and/or a predetermined time period during which the output signal exceeds a particular level, and may be stored in an electronic storage device accessible by the processor 68, for example. For instance, the PWM drivers may typically output small pulses to move the motor, but the pulse width (duty cycle) may also be at a full, i.e. 100%, value for a very short period of time, such as one-eighth of a second or the like, in order to first move the motor from a stand still to the commanded speed. As such, the threshold may be defined based on the fact that the PID integrator will not spend much more time at a maximum saturated output value than the motor takes to come up to the commanded speed. One exception is when the motor is commanded to run at more than its maximum attainable speed.

The method may further include monitoring one or more parameters of the video camera assembly (Step 76), including the PID and/or the PWM signal output, a timing of the output, and/or the speed of either and/or both of the pan motor 24b and the tilt motor 42 (and any other motor along any particular axis in a desired application), via the respective encoders 24c and 42a, for example. Subsequently, a determination can be made as to whether the defined thresholds for one or more of the parameters have been exceeded (Step 78), likely indicating an abnormal stall or impeded movement situation with the potential to damage the motor and/or surveillance system component. If the threshold has been exceeded, the signal driving the motor may be terminated to prevent damage to the system (Step 80), i.e., the processor 68 may terminate the output of the PID processor 54, 64 and/or the PWM driver 56, 66, for example.

When the overload protection is triggered, the PID output may be forced to zero, removing the drive to the motor. Upon triggering the shut-down or termination of the signal to the motor, the processor 68 may communicate the error to the monitoring station 72 via the communication network 70 (Step 82). The processor may prevent signal output to the motor until the system has been repaired and/or the processor has been reset, which may include receipt of a reset command from the monitoring station 72, for example. Accordingly, an operator can be alerted of a malfunction and may further reset the protection scheme, upon clearing an obstruction for example, without having to power down the dome should replacement and/or repair not be necessary.

As an illustrative example of the method described above, locked rotor protection or overload protection may be provided for a motor and/or video surveillance system by detecting that the PID processor integrator has been at a maximum or saturated value for a time period longer than two times the amount of time that would normally be required for the motor to accelerate and reach the commanded speed, and additionally, the measured speed is below a pre-determined cutoff speed. Upon realizing these conditions, the motor/video surveillance system may be shut down to prevent damage or overload. However, if the measured speed is higher than this pre-determined cutoff speed, the motor is likely not overloaded and therefore the signal to the motor would not be terminated. The above referenced steps can be performed by the processor 68, for example.

The exemplary method of operating the motor and/or video surveillance system may also generally provide for manual adjustment of a video camera assembly employing the over-current protection scheme/method described above. Such manual camera positioning allows manual aiming, focus, and/or zoom manipulation of a video camera upon loss of system communication and/or normal functionality. As described above, system communication or functionality can be lost for a number of reasons due to malfunction or inoperability of one or more components disposed between a video camera assembly and a command origination point. The PID/PWM based over-current protection system described above may be in effect for the duration of the video camera use, whether the camera is idle or changing positions. For example, the described system and method may limit the length of time the motor is drawing high current when it is trying to change position, as well as when the video camera is at rest and maintaining the current position. Under normal system control, when the camera assembly has reached the desired position, the amount of motor torque to hold that desired position is at least a magnitude less than that required for accelerating or decelerating. Therefore, in the position hold mode, the over-current protection solution described above can be triggered at a much lower threshold value without causing nuisance trips.

Figure 6:
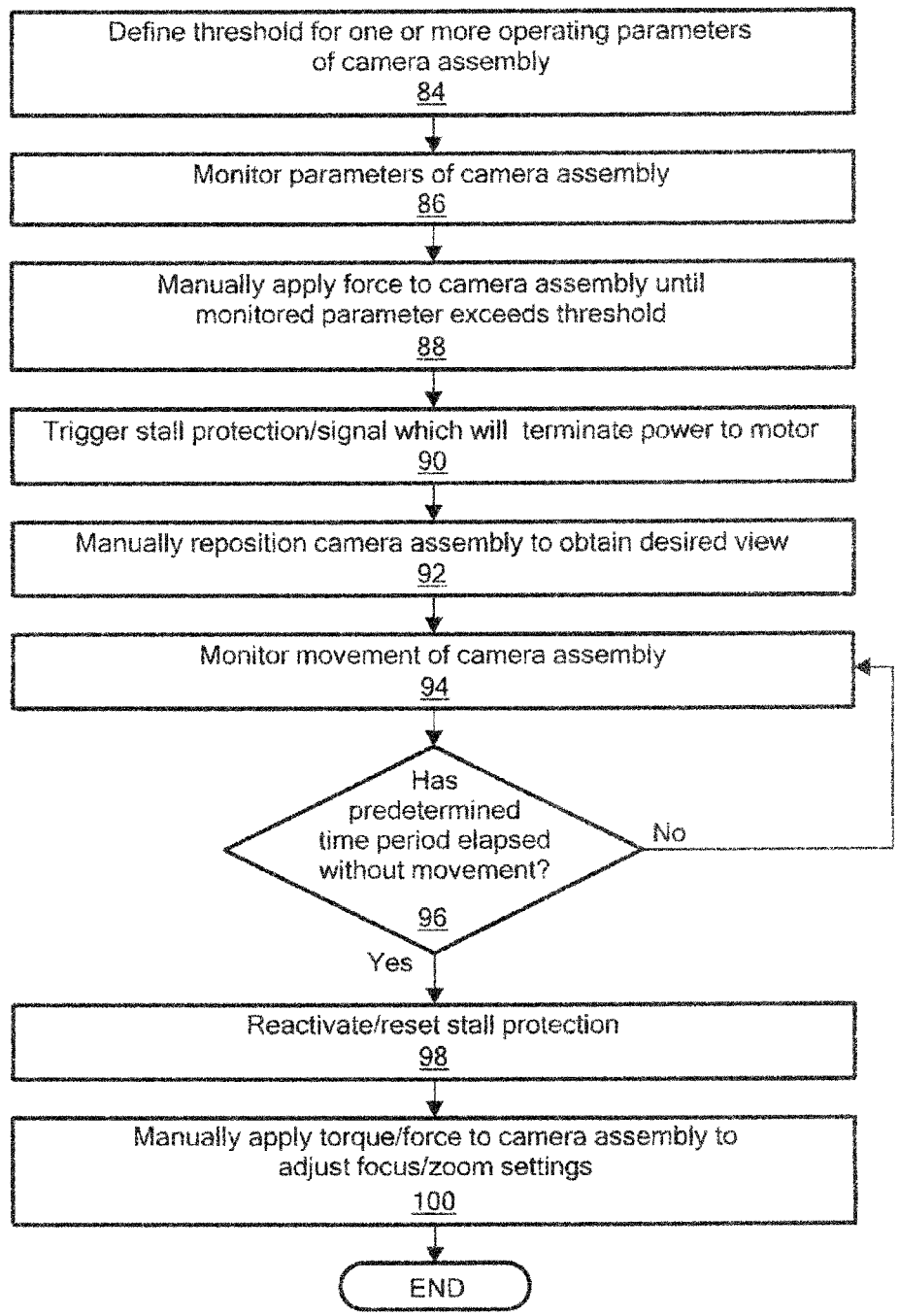
FIG. 6 is a flow chart of an exemplary method for repositioning a video surveillance system in accordance with the present invention.

Now referring to the flow chart of FIG. 6, a method of the present invention includes defining a threshold for one or more operating parameters of the camera assembly when the camera assembly is not in motion and/or is at a fixed, maintained position (Step 84). This defined threshold may be a secondary threshold distinct from the threshold defined above, which may be utilized when the camera assembly is in motion. The video surveillance system may alternate between the two defined thresholds during operation of the system by monitoring the motion of the camera via the encoders, for example, to determine the appropriate threshold to use at any given time (i.e., in motion or maintaining a fixed position). The defined threshold parameters may include, for example, an output value of the PID processor 54, 64 and/or the PWM drivers 56, 66 which may damage the tilt and pan motors 24b, 42b, as well as a speed of the motor.

The method may further include monitoring one or more parameters of the video camera assembly (Step 86), including the PID and/or the PWM signal output, a timing of the output, and/or the speed of either and/or both of the pan motor 24b and the tilt motor 42 (and any other motor along any particular axis in a desired application), via the respective encoders 24c and 42a, for example. Subsequently, a nominal force may be applied by an operator to the video camera assembly (Step 88)

along either of the tilt or pan axes when the assembly is holding a current position until the defined threshold is exceeded and the processor intercedes to terminate signal to the motor (Step 90), as described above. Once the protection scheme is triggered, the camera assembly can be easily moved by hand along the desired axes (Step 92), as the motor is not receiving any current to maintain its position or to resist manual manipulation of the assembly (typically, the gear train provides enough resistance to hold the camera assembly in the modified position if released by an operator so long as no other force is applied). Accordingly, an operator may "overpower" the camera assembly motors by applying a relatively small force until the stall protection is triggered, and then aim the camera at the particular area of interest without damaging the motors.

The method may further include monitoring any movement of the camera assembly, via the encoders for example, after the over-current protection has been triggered and the manual adjustments to the camera position have been made (Step 94). The system may then make a determination whether the position has not changed for some predetermined period of time (Step 96), at which point the processor could reactivate or reset the over-current protection (Step 98) and lock-in the current camera position by again providing a driving signal to the motor to produce sufficient torque to maintain the camera position. As such, following the manual readjustment of the camera assembly to obtain the desired video field, the camera may automatically be electrically locked into place at the desired position to reduce the likelihood that the camera may be unintentionally bumped or otherwise moved out of the manually set position. At the time the processor re-activates over-current protection, the processor may direct the motors to move the camera assembly along some pre-determined offset or pattern and then return to the new manually selected position in order to indicate to the operator that protection has been re-activated.

After manually repositioning the camera and the reactivation of the over-current protection, the camera assembly may be further manually manipulated for zoom and focus adjustment. In particular, torque may be applied to the camera assembly along the pan and tilt axes resulting in corresponding error values that can be detected and used as operator inputs to control zoom and focus settings (Step 100). For example, when the torque is applied to the camera assembly, the PID processor and/or PWM driver will output a higher signal value to the motor in an attempt to maintain the position. This increased signal output can be monitored and a zoom or focus setting can be adjusted accordingly with a magnitude corresponding to the signal value. After another predetermined period of time where the processor does not detect significant error terms for adjustment of the focus and/or zoom settings, the camera assembly may then revert back to a normal hold of pan, tilt, and zoom position having the manually configured settings. The above referenced steps can be performed by the processor 68, for example.

Employing the above-described method, the video camera assembly can be used as a stationary camera until communication with the monitoring station 72 and/or normal operating conditions can be reestablished. If power is lost following the manual configuration of the camera assembly, the camera assembly may return to the last position it was in before power was lost upon reestablishing power to the camera. Moreover, the manual positioning and/or configuration of the video camera assembly may be maintained until a valid command is received across the repaired system, network, or the like.

This invention advantageously provides a locked rotor over-current protection system at very low cost. This feature can be implemented on new or existing video surveillance system designs simply by changing a few lines of software or FPGA code. The present invention also provides for manually aiming a video dome when communication input has been lost. The provided manual aiming and adjusting scheme is an extremely low cost solution that can be implemented with small programming changes to the novel stall protection scheme described above.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A video surveillance system, the system comprising:
   a video camera;
   a motor operable to move the video camera; and
   a processor assessing a signal value corresponding to an amount of accumulated current provided to the motor, the processor terminating the current to the motor when the assessed signal value exceeds a predetermined value for a predetermined period of time, the processor allowing manual repositioning of at least a portion of the video surveillance system when current to the motor is terminated, and the processor reinitiating the current to the motor after a predetermined period of time, the reinitiating of the current providing sufficient current to maintain a position after manual repositioning.

2. The video surveillance system according to claim 1, wherein the processor assesses a speed of the motor, the processor terminating the current to the motor when the assessed signal value exceeds a predetermined value for a predetermined period of time and the assessed speed is less than a predetermined speed value.

3. The video surveillance system according to claim 2, further comprising:
   a pulse-width-modulation driver in electrical communication with the processor and the motor, the driver providing the signal to the motor; and
   a decoder generating a speed output based on revolutions of the motor, the assessed speed of the motor based at least in part on the speed output.

4. The video surveillance system according to claim 1, further comprising a communication network coupled to the processor, the processor communicating the termination of the current across the network.

5. The video surveillance system according to claim 1, wherein the processor monitors a signal value corresponding to the amount of current and adjusts at least one of a zoom setting and focus setting of the video camera based at least in part on the monitored signal value.

6. A method of operating a video camera assembly having at least one motor, the method comprising:
   defining a threshold signal value corresponding to an accumulation rate of current provided to the motor;
   monitoring a value of a signal corresponding to an accumulation rate of current provided to the motor;
   determining that the monitored signal value exceeds the threshold signal value for a predetermined period of time;
   terminating the current to the motor;
   allowing manual repositioning of at least a portion of the video camera assembly when current to the motor is terminated; and reinitiating the current to the motor after a predetermined period of time, the reinitiating of the current providing sufficient current to maintain a position after manual repositioning.

7. The method according to claim 6, wherein the signal is a pulse-width-modulation signal.

8. The method according to claim 7, wherein the defined threshold signal value is less than 100% for a pulse-width-modulation signal duty cycle.

9. The method according to claim 6, further comprising:
defining a threshold speed of the motor;
monitoring a speed of the motor;
determining that the monitored speed is lower than the threshold speed; and
terminating the current to the motor being based at least in part on the monitored speed of the motor.

10. The method according to claim 6, further comprising communicating the termination of the current across a communication network.

11. The method according to claim 6, further comprising manually applying a force to the assembly until the monitored signal value exceeds the threshold signal value.

12. The method according to claim 6, further comprising:
monitoring movement of at least a portion of the video camera assembly, and
reestablishing current to the motor after a predetermined time period lapses without any monitored movement.

13. The method according to claim 6, further comprising manually
applying a force to at least a portion of the camera assembly to adjust of at least one of a focus setting and zoom setting of the camera assembly.

14. A motor over-current protection system for a camera assembly, the system comprising:
a processor electrically coupled to the camera assembly, the processor assessing (a) a signal value corresponding to an accumulated amount of current provided to a motor and (b) a speed of the motor, the processor terminating the current to the motor based on at least one of the assessed signal value and the assessed speed, the processor allowing manual repositioning of at least a portion of the camera assembly when current to the motor is terminated, and the processor reinitiating the current to the motor after a predetermined period of time, the reinitiating of the current providing sufficient current to maintain a position after manual repositioning.

15. The motor control system according to claim 14, wherein the processor terminates the current provided to the motor when the signal value exceeds a predetermined value for a predetermined period of time.

16. The system according to claim 14, wherein the processor terminates the current to the motor when the assessed signal value exceeds a predetermined value for a predetermined period of time and the assessed speed is less than a predefined speed value.

17. The system according to claim 14, further comprising a pulse-width-modulation driver in electrical communication with the processor, the pulse-width-modulation driver providing the current to the motor by adjusting a duty cycle of the signal.

* * * * *